March 24, 1970 J. L. SMITH 3,502,190
TAPELESS CARRIAGE CONTROL SYSTEM
Filed Dec. 15, 1966
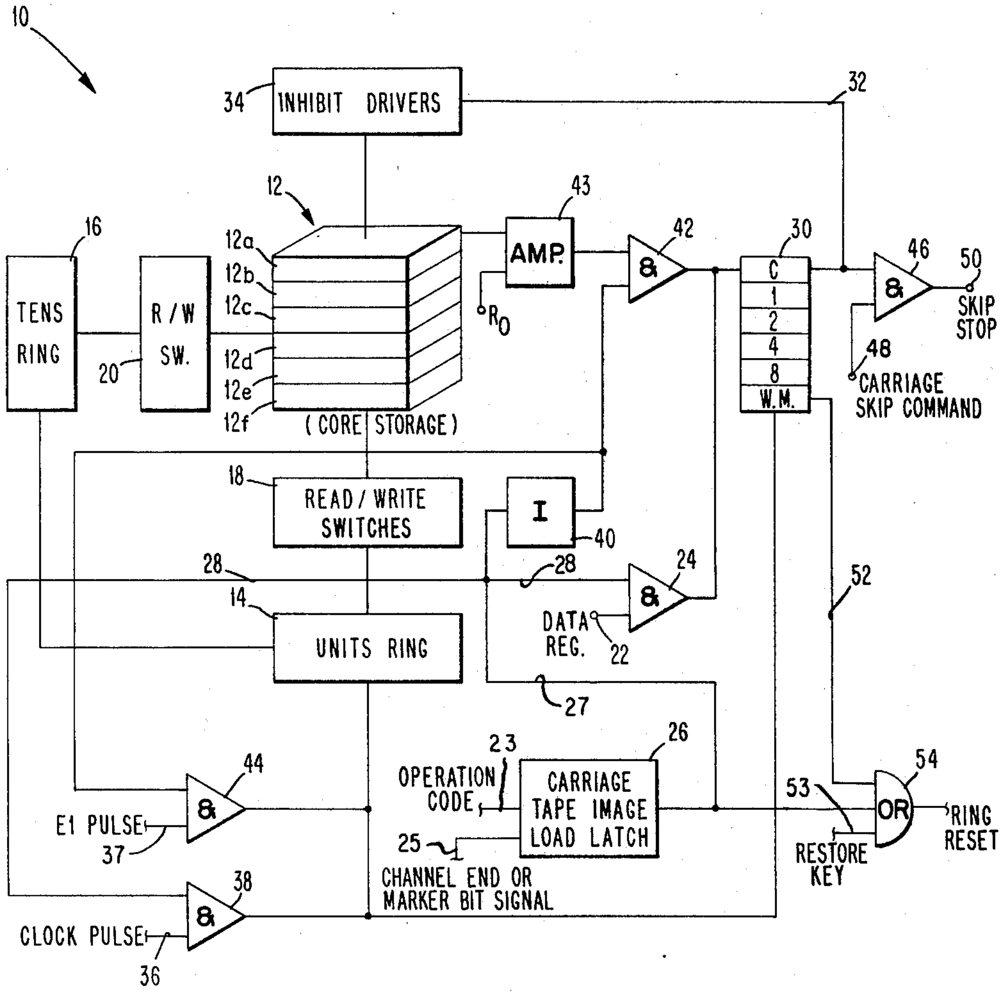
*INVENTOR*
JOHN L. SMITH
BY Francis V. Giolma
*ATTORNEY*

United States Patent Office 3,502,190
Patented Mar. 24, 1970

3,502,190

TAPELESS CARRIAGE CONTROL SYSTEM

John L. Smith, Hidden Hills, Calif., assignor to International Business Machines Corporation, Armonk, N.Y., a corporation of New York Filed Dec. 15, 1966, Ser. No. 601,888
Int. Cl. B41j 15/00
U.S. Cl. 197—133 2 Claims

ABSTRACT OF THE DISCLOSURE

In a tapeless carriage control for a printer, images of channel skip commands are stored by clock pulses at particular line positions in a core storage device having a plurality of storage positions corresponding to the lines of a document to be printed. The storage device is addressed under control of carriage emitter pulses as the carriage advances until a compare is made with a skip command from a central processing unit whereupon a skip-stop magnet is energized to stop the carriage at the programmed address.

This invention relates generally to printing, and has reference in particular to a tapeless carriage control system for a printer carriage.

Record feeding devices for feeding continuous forms in printing machines or the like, and particularly on those used with data processing equipment, are required frequently to not only space the form from one line to the next, but also to skip from one line to another which may be but a few or many lines ahead, depending upon a skip command or instruction from a central processing unit. Such operations have herebefore been principally effected by using a punched paper tape having a plurality of channels in which information is pre-punched at particular locations corresponding to particular lines of the document for effecting operation of a skip-stop magnet as described in the Mills et al. Patent No. 2,531,885, for example, entitled "Paper Feeding Devices" and which issued on Nov. 28, 1950. The processing unit as therein described commands a skip to a particular one of several channels in which a hole is punched at the particular line for emitting a stop pulse for effecting operation of the stop magnet at the desired line.

An improvement on the Mills et al. patent is described in the Thompson Patent No. 2,983,356, entitled "Control Apparatus for Record Feeding Devices," which issued on May 9, 1961, and which uses a line stopping register and a line indicating counter to produce a stop signal for the stop magnet. However, this arrangement requires a line count command to be addressed to the printer from the central processing unit for effecting a skip-stop, and the programming for such a command is not completely compatible with the programming used in the corresponding paper tape controlled systems. This presents a programming problem which has hindered the acceptance of control system of the type disclosed in the Thompson patent.

Generally stated, it is an object of this invention to provide a tapeless carriage control system which is program compatible with tape controlled systems, but is without the disadvantages thereof.

More specifically, it is an object of this invention to provide for replacing the punched paper tape in a printer carriage control system and its drive and brush contact mechanisms by a magnetic core storage device for storing bits representing the images of the channel markings in a paper tape such as previously used to control the printer carriage.

It is also an object of the present invention to provide a tapeless carriage control system in which the stored skip-stop information is compatible with the system programs presently used for controlling paper tape controlled carriages.

Yet another object of this invention is to provide for replacing the well-known punched paper tape arrangement for controlling the operation of printer carriages with a stored program magnetic storage device in which the stored images may be readily changed to store images of different carriage control programs.

It is also an object of this invention to provide for using a magnetic core storage device which may be loaded with coded channel representations at different addresses for controlling the stopping of the carriage in skip operations.

More specifically, it is an object of this invention to provide for using a storage device which can be loaded with coded representations of the individual channel punchings which would be used in a paper tape controlling the carriage and is scanned in accordance with advance of the carriage to provide a stop signal when a stored channel representation coincides with the channel representation of the skip command from a central processing unit.

In practicing the invention in accordance with a preferred embodiment thereof, a magnetic core storage device is provided having a plurality of storage positions corresponding to the number of lines on a document to be printed, and which may be loaded from a central processing unit with coded representations of the different channel control punches such as used in a corresponding paper tape controlled carriage for determining the stopping points of a number of skip operations. The loading is performed under the control of an image load latch which responds to a Load Operation code from a processing unit, and takes place as the storage device is addressed by X–Y address rings driven by timed signals from the system clock. A single character register is used for readout of the storage device which proceeds under emitter control signals from a carriage emitter and operates a gate when a compare occurs with a processor skip command, to produce a skip-stop signal for operating the carriage skip-stop magnet when the programmed stop address is reached. A word mark stored in an additional core plane with the coded channel representations is used to reset the rings when the end of the page is reached.

The foregoing and other objects, features and advantages of the invention will be apparent from the following more particular description of a preferred embodiment of the invention, as illustrated in the accompanying drawing.

In the drawing:

The single figure is a schematic representation of a tapeless carriage control system embodying the invention in a preferred form.

Referring to the single figure of the drawing, the reference numeral 10 denotes generally a tapeless carriage control system in which coded representations of a number of channel designations corresponding to different ones of the channels 1 to 12 such as used in the paper tape carriage control system of the Mills et al. patent are stored in a binary coded designation, for example, in a multiplane core storage device 12 which may comprise six core planes 12*a–f* for the 1, 2, 4 and 8 binary digits together with a C parity bit and a word mark which may be used to designate the end of the page. The core storage device 12 may have any number of storage positions and can, for example, comprise a 10 by 14 storage arrangement so as to accommodate 140 different storage positions corresponding to the lines on a document to be printed. Coded representations of the channels according to a binary designation are stored at the different line positions where stopping is desired. These representations are stored in the storage device 12 under the control of a unit ring 14 and a tens ring 16 with the corresponding read-write switches 18 and 20 which control the usual X–Y read-write lines. Write-in of representations, read-out and regeneration thereof are effected in the usual manner, such as, for example, described in Patent No. 3,312,174 to J. M. Cunningham, or Patent No. 3,066,601 to H. E. Eden.

Information is loaded into the storage device 12 from a central processing unit (not shown) at input line 22, for example, where it is gated by means of a plurality of gates represented by the AND circuit 24 by means of a signal from a carriage Tape Image Load Latch 26 (which is turned on by an Operation Code from the central processing unit) over lines 27 and 28, and thence through a single character register 30 and by way of line 32 and the usual inhibit drivers 34 which also provide for regeneration upon read-out in the usual manner. The core storage device 12 is addressed by clock signals from the central processing unit over the input line 36 where they are gated in AND circuit 38 with an output signal from the Image Load Latch 26 over the line 28. When the loading of the storage device 12 is completed, the latch 26 is reset either by a channel end signal at input 25 from the central processing unit, or a marker bit signal.

An inverter 40 is provided for inverting the Image Load Latch output signal so as to enable a gate circuit represented by the AND circuit 42 for scanning the storage device 12 to read out the stored channel representations through sense amplifiers 43 in conjunction with a readout clock signal $R_0$, into the register 30, one by one as the storage device 12 is scanned under the control of the rings 14 and 16, which are driven by pulses from a carriage emitter such as the emitter 101 of the Thompson patent, over input line 37 through AND circuit 44 where they are gated with the output from the inverter 40. Compare means represented by the and circuit 46 are provided for comparing the several digit positions of the coded representations in the register 30 with a Carriage Skip Command signal from the central processing unit at input line 48 to produce a Skip-Stop signal at output 50 for operating the carriage skip-stop magnet (not shown) when the coded image representation in the register 30 coincides with the processor skip-stop command representation.

Whenever the coded representations read into the register 30 contain a word mark which has been stored in the lower-most plane (designated W. M.) in the storage position representing the last line of the document, an output will be provided over the line 52 for activating OR circuit 54 and for producing a ring reset signal for resetting the units ring 14 and tens ring 16. A connection from the Image Load Latch 26 and a machine restore or reset key signal at an input 53 may be also used in the OR circuit 54 for producing the ring reset signal.

In operation, the central processing storage would be loaded by means of cards or other suitable means so as to have in a 140 position storage device images of the channel markings of a paper tape such as previously used to control the printer carriage operation. Once this information is set up, an Operation Code would be executed and a signal applied to the Image Load Latch 26 at input 23 to cause a memory-to-memory transfer from the central processing unit to the carriage tape image core storage device 12. The Operation Code turns on the Tape Image Load Latch 26 which causes the storage device 12 to be loaded from the system storage at the system clock speed by means of pulses through the AND circuits 38. The Image Load Latch 26 is then reset at the end of the operation by a channel end or marker bit signal at input 25, putting the addressing and readout of the storage device 12 under the control of the carriage emitter signal at input 37 through AND circuit 44, causing it to be scanned in step with movement of the carriage which may be started by a suitable carriage start signal in the usual manner, which results in operation of a skip-start magnet (not shown) or the like, since an emitter pulse is produced by a carriage emitter each line during spacing and skipping. Whenever the coded representation in the signal character register 30 corresponds to the carriage skip command stop signal applied from the processor at the input 48 of AND circuit 46, a skip-stop signal is produced at the output 50 of and 46 for operating the carriage skip-stop magnet (not shown) ot stop the carriage. Whenever a storage position of storage plane 12*f* of the storage device 12 contains a word mark, readout into the register 30 produces an output signal on line 52 for producing an output from the OR circuit 54 to reset the rings 14 and 16.

Instead of punching a paper tape in different ones of from 1 to 12 channels at any of from 1 to 140 or more lines it is desired to skip to, the present invention replaces the paper tape and all the mechanism drive therefore with a magnetic core storage device 12 and its associated *x–y* address rings. The images of the channel representations on the paper tape are stored in the core storage, which is thereafter addressed by a counter so as to be stepped in relation to the paper by means of carriage emitter pulses. Such an arrangement is highly flexible since the carriage forms layout could be changed between pages or even during a page. The invention results in faster set up time, since the operator no longer has to prepare and mount a carriage tape. Errors are reduced since a specific program is loaded from the central processing unit, and the chance of installing the wrong tape is eliminated. Errors and mis-operation caused by worn or torn tapes, bent brushes, etc. are also eliminated.

What is claimed is:

1. In a skip control system 10 for operating a carriage to move a document to different line positions in a high-speed printer having skip-start means responsive to signals from a printer control system for starting a carriage skip operation and skip-stop means for stopping the skip operation, the improvement comprising;
   - magnetic core storage means 12 storing coded representations of channel skip commands at one or more different address positions corresponding to different line positions of the document;
   - means including *x–y* address rings 14–16 for addressing the different address positions of said magnetic core storage means 12 to read out the stored channel skip command coded representations;
   - means including a load latch 26 connected to said address rings 14–16 to provide for storing coded representations of channel skip commands at one or more different address positions of said magnetic core storage means; and
   - compare means 46 connected to said magnetic core storage means 12 and to a channel skip command input 48 from a central processing unit for comparing said stored channel skip command coded representations at said different address positions with a central processing unit channel skip command coded representation at said input and producing a skip-stop signal for application to said carriage stop means upon an equal compare between a stored channel skip command coded representation and said central processing unit channel skip command.

2. The invention as defined in claim 1 characterized by the load latch 26 having two operating positions and being connected to operate selectively in response to a first AND circuit 44 to control said address rings 14–16 in response to carriage emitter pulses when reading out coded representations of channel skip commands, and to a second AND circuit 38 to control said address rings 14–16 in response to system clock pulses when storing said coded representations of channel skip commands.

References Cited

UNITED STATES PATENTS

| | | | |
|---|---|---|---|
| 2,944,651 | 7/1960 | Malcolm et al. | 197—133 |
| 3,094,261 | 6/1963 | Thompson | 197—133 X |
| 3,123,195 | 3/1964 | Hewitt et al. | 197—133 |
| 3,171,349 | 3/1965 | Kodis et al. | 101—93 |
| 3,192,854 | 7/1965 | Martin | 101—93 |
| 3,312,174 | 4/1967 | Cunningham | 197—133 X |
| 3,343,131 | 9/1967 | Bloom et al. | 101—93 X |

ERNEST T. WRIGHT, Jr., Primary Examiner